United States Patent [19]

Seki et al.

[11] Patent Number: 5,067,087
[45] Date of Patent: Nov. 19, 1991

[54] COMPOSITE-FIGURE DEFINITION METHOD

[75] Inventors: Masaki Seki; Takashi Takegahara, both of Tokyo; Takeshi Arakaki, Yamanashi, all of Japan

[73] Assignee: Fanuc Ltd., Minamitsuru, Japan

[21] Appl. No.: 415,235

[22] PCT Filed: Dec. 13, 1988

[86] PCT No.: PCT/JP88/01262
§ 371 Date: Aug. 21, 1989
§ 102(e) Date: Aug. 21, 1989

[87] PCT Pub. No.: WO89/06006
PCT Pub. Date: Jun. 29, 1989

[30] Foreign Application Priority Data

Dec. 21, 1987 [JP] Japan ............... 62-323425

[51] Int. Cl.$^5$ ............................................. B23Q 15/22
[52] U.S. Cl. ..................... 364/474.24; 364/188; 364/192; 364/514; 395/135
[58] Field of Search ............. 364/188, 474.24, 514, 364/518, 191, 192

[56] References Cited

U.S. PATENT DOCUMENTS

| | | | |
|---|---|---|---|
| 4,556,957 | 12/1985 | Ichikawa | 364/474.24 |
| 4,618,924 | 10/1986 | Hinds | 364/474.25 |
| 4,648,028 | 3/1987 | Deklotz et al. | 364/474.24 |
| 4,697,249 | 9/1987 | Kishi et al. | 364/474.24 |
| 4,792,889 | 12/1988 | Krägelin et al. | 364/474.24 |
| 4,868,781 | 9/1989 | Kimura et al. | 364/518 |

Primary Examiner—Jerry Smith
Assistant Examiner—Patrick Muir
Attorney, Agent, or Firm—Staas & Halsey

[57] ABSTRACT

In a case where a figure composed of already defined first and second figures (1, 2) is defined, it is determined whether the first and second figures (1, 2) have a point of intersection by designating the first and second figures (1, 2). If they do not, it is construed that a composite figure cannot be created and an error is displayed. If they do have a point of intersection, it is determined whether at least one of the first and second figures (1, 2) is an open figure. If neither is an open figure, closed figures obtained by combining the first and second figures (1, 2) are successively painted or displayed so as to be distinguishable from other figures. When a desired closed figure is displayed or painted, this closed figure is selected to define the composite figure. If one of the first and second figures is an open figure, open figures obtained by combining the first and second figures are successively displayed so as to be distinguishable from other figures. When a desired open figure is displayed, this open figure is selected to define the composite figure.

11 Claims, 10 Drawing Sheets

FIG. 2

COMPOSITE-FIGURE DEFINITION METHOD

BACKGROUND OF THE INVENTION

1. Field of the Invention

This invention relates to a composite-figure definition method and, more particularly, to a composite-figure definition method for combining already defined first and second figures to define a new figure.

2. DESCRIPTION OF RELATED ART

In an automatic programming system for creating NC data using an automatic programming language such as APT (automatic programming tools) or FAPT, (a) a part program based on the automatic programming language is created by defining points, straight lines and circular arcs using simple symbols (this is referred to as "figure definition"), defining a profile using the defined points, straight lines and circular arcs, and then defining a tool path along the profile (referred to as "motion statement definition"), and (b) the part program based on the automatic programming language is subsequently converted into NC data comprising NC data (EIA codes or ISO codes) in a format capable of being executed by an NC unit.

For example, in the creation of a part program for moving a tool along a part profile 1 comprising straight lines $S_1$–$S_4$ shown in FIG. 10, figure definition is performed by defining straight lines $S_1$–$S_4$, which are necessary for defining the part profile 1, as follows using a keyboard or tablet:

$$S_1 = x_1 X \quad (1)$$

$$S_2 = y_1 Y \quad (2)$$

$$S_3 = x_2 X \quad (3)$$

$$S_4 = y_2 Y \quad (4)$$

Thereafter, these defined figure elements (which are displayed on a CRT screen) are picked in order, e.g., $$S_1 \rightarrow S_2 \rightarrow S_3 \rightarrow S_4$$

to define the part profile 1, and then machining starting and end points, etc., of the part profile 1 are designated by motion statement definition to define a tool path along which a tool is moved.

In the creation of a part program for moving the tool along a part profile 2 comprising straight lines $S_6$–$S_8$ shown in FIG. 10, figure definition is performed by defining straight lines $S_6$–$S_8$, which are necessary for defining the part profile 2, as follows:

$$S_6 = P(x_3, y_3), P(x_4, y_4) \quad (5)$$

$$S_7 = P(x_4, y_4), P(x_5, y_5) \quad (6)$$

$$S_8 = P(x_5, y_5), P(x_3, y_3) \quad (6)$$

Thereafter, these defined figure elements are picked in order, e.g., $$S_6 \rightarrow S_7 \rightarrow S_8$$

to define the part profile 2, and then a tool path is defined by motion statement definition.

In the foregoing, (1) signifies a straight line parallel to the Y axis and whose X intercept is $x_1$;

(2) signifies a straight line parallel to the X axis and whose Y intercept is $y_1$; and (5) signifies a straight line passing through coordinates $(x_3, y_3)$ and $(x_4, y_4)$.

In defining a part profile, there are instances where figures (profiles) already defined are combined to define a new figure. Even in a case such as this, the prior art is such that the figure elements constituting the profiles must be defined one at a time, after which the elements constituting the profiles must be designated in order, as set forth above.

By way of example, assume that a new FIG. 3 (FIG. 11) is defined by combining the already defined first FIG. 1 and second FIG. 2 shown in FIG. 10. In such case, straight-line elements $S_i$ must be designated one at a time in order, namely in the manner $S_1 \rightarrow S_2 \rightarrow \ldots \rightarrow S_8$, along the profile of the desired combined figures by means of a graphic cursor GCS.

Thus, a problem with the composite-figure definition method of the prior art is that despite the fact that the basic figures are already defined in terms of profile, the profile definitions of the basic figures cannot be utilized.

Accordingly, an object of the present invention is to provide a composite-figure definition method in which the profile definitions of basic figures can be utilized to enable composite definition of figures quickly and easily.

SUMMARY OF THE INVENTION

In a case where already defined first and second figures are combined to define a new figure, it is determined whether the first and second figures have a point of intersection. It they do not, an error is displayed. If they do have a point of intersection, all closed figures formed by combining the first and second figures are successively displayed and a composite figure is defined by selecting a desired closed figure.

In accordance with the composite-figure definition method of the present invention, already defined profiles can be utilized to enable definition of a composite figure quickly and easily.

BRIEF DESCRIPTION OF THE DRAWINGS

FIG. 2 is a view for describing the principal portion of a menu chart;

FIGS. 4 through 6 are examples of conversational screens in the composite-figure definition method of the present invention, in which FIGS. 4 and 5 are conversational screens used when selecting closed figures as basic figures and FIGS. 6(a), (b), (c), and (d) are conversational screens for specifying a composite figure;

FIGS. 7 through 9 are examples of conversational screens in the composite-figure definition method of the present invention, in which FIG. 7 is an explanatory view for a case where an open figure is selected as a basic figures, FIGS. 8(a) and (b) are a conversational screens for specifying a composite figure in a case where the composite figure is closed, and FIGS. 9(a) and (b) are conversational screens conversational for specifying a composite figure in a case where the composite figure is not closed.

DESCRIPTION OF THE PREFERRED EMBODIMENTS

Figure 1:
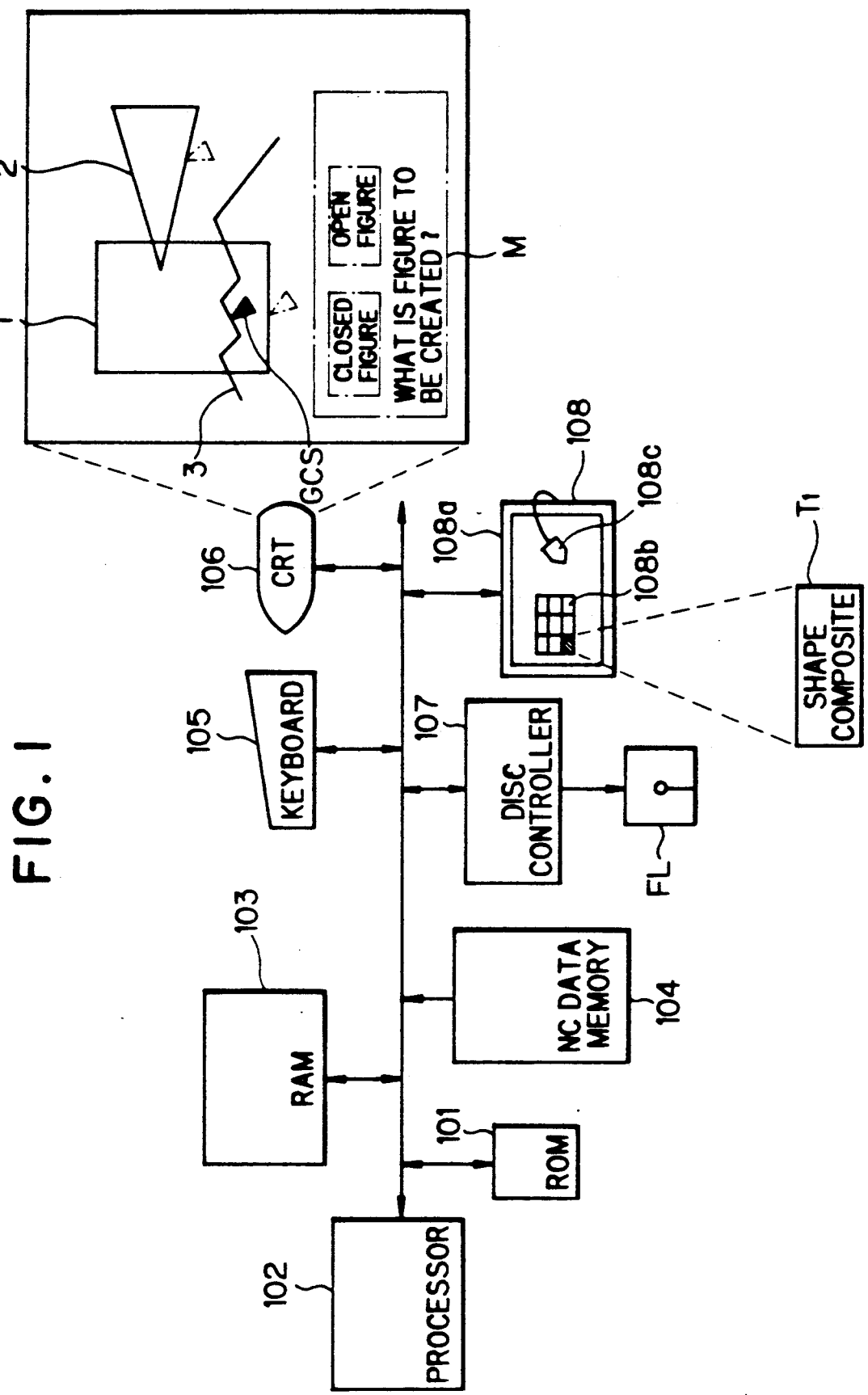
FIG. 1 is a block diagram of an apparatus for practicing the present invention.

FIG. 1 is a block diagram of an apparatus for practicing the present invention.

Numeral 101 denotes a ROM storing a loading program and the like, 102 a processor for executing automatic programming processing, and 103 a RAM, for storing a system program read in from a floppy disk FL, as well as various parameters and results of processing. Numeral 104 denotes an NC data memory for storing the finally created NC data having an executable format, 105 a keyboard, 106 a display unit (CRT), 107 a disc controller, and 108 a tablet device having a tablet surface 108a to which a menu chart 108b having menu items is affixed. Prescribed menu items are picked by a tablet cursor 108c. A graphic cursor on a display screen is moved by moving the cursor 108c on the tablet surface 108a. FL represents a floppy disc.

Numerals 1, 2 and 3 on the CRT 106 denote profiles that have already been defined. M represents a message inquiring as to whether a composite figure is a "CLOSED FIGURE" or an "OPEN FIGURE". GCS is a graphic cursor.

Figure 2:
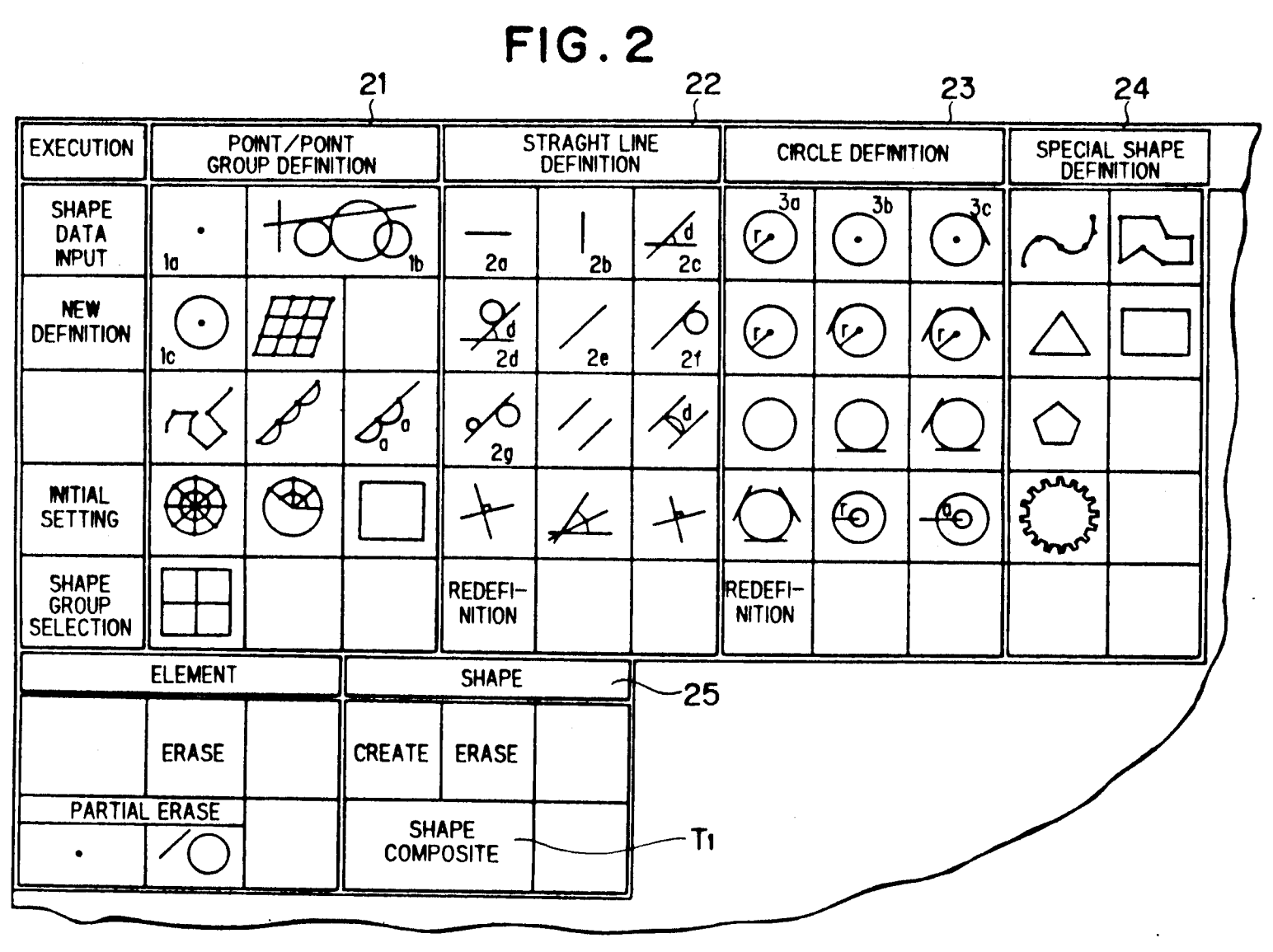

FIG. 2 is a view for describing the principal parts of the menu chart 108b. Numeral 21 is a "POINT/POINT GROUP DEFINITION" section, 22 a "STRAIGHT LINE DEFINITION" section, 23 a "CIRCLE DEFINITION" section, 24 a "SPECIAL SHAPE DEFINITION" section and 25 a "SHAPE EDIT" section. The "SHAPE EDIT" section 25 includes a "SHAPE COMPOSITE" item $T_1$ picked when a new figure is defined by combining already defined figures.

Figure 3:
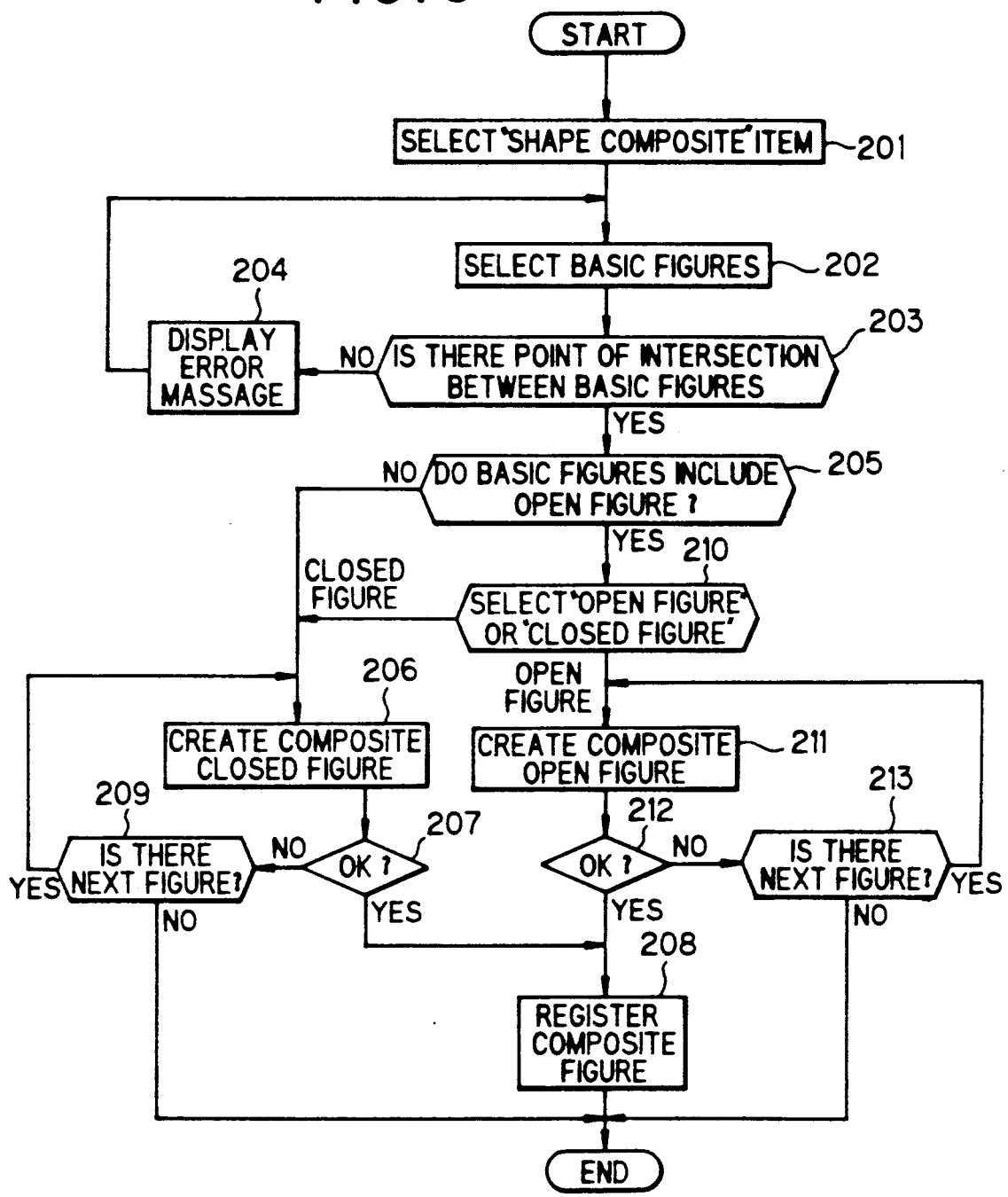
FIG. 3 is a flowchart of processing according to the invention.

The composite-figure definition method of the invention will now be described in accordance with the processing flowchart of FIG. 3 and the views of FIGS. 4 through 9 for explaining processing. It is assumed that the FIGS. 1, 2, 3 shown in FIG. 4 have already been defined, and that these are being displayed on the CRT screen of the display unit 106. The part program of FIG. 1 is $$S_1 = x_1 X$$
$$S_2 = y_1 Y$$
$$S_3 = x_2 X$$
$$S_4 = y_2 Y \ldots$$

The foregoing is a figure definition portion (i).

$S_1, S_2, S_3, S_4 \ldots$ This is a profile definition portion (I).
PEND . . . . Program end
The part program of FIG. 2 is $$S_6 = P(x_3, y_3), P(x_4, y_4)$$
$$S_7 = P(x_4, y_4), P(x_5, y_5)$$
$$S_8 = P(x_5, y_5), P(x_3, y_3) \ldots$$

The foregoing is a figure definition portion (ii).

$S_6, S_7, S_8 \ldots$ This is a profile definition portion (II).
PEND
The part program of FIG. 3 is $$S_{10} = P(x_6, y_6), P(x_7, y_7)$$

-continued $$S_{11} = P(x_7, y_7), P(x_8, y_8)$$
$$S_{12} = P(x_8, y_8), P(x_9, y_9)$$
$$S_{13} = P(x_9, y_9), P(x_{10}, y_{10})$$
$$S_{14} = P(x_{10}, y_{10}), P(x_{11}, y_{11})$$
$$S_{15} = P(x_{11}, y_{11}), P(x_{12}, y_{12}) \ldots$$

The foregoing is a figure definition portion (iii).

$S_{10}, S_{11}, S_{12}, S_{13}, S_{14}, S_{15} \ldots$ This is a profile definition portion (III). PEND In a case where a new composite figure is defined by using FIGS. 1, 2, 3, the operator establishes a composite figure input mode by selecting the "SHAPE COMPOSITE" item $T_1$ in the "SHAPE EDIT" section 25 on menu chart 108b (step 201).

Figure 4:
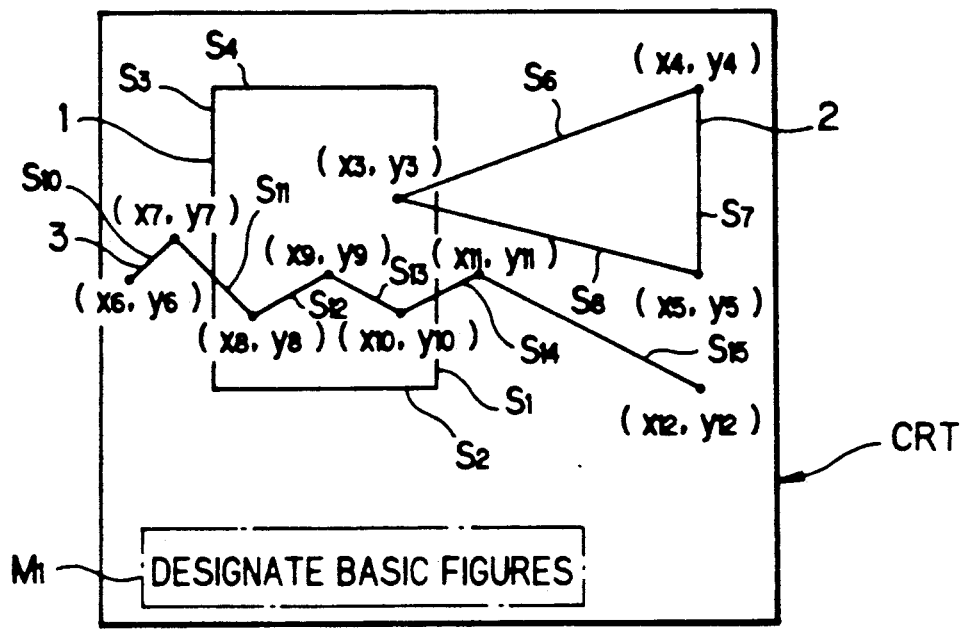
Figure 5:
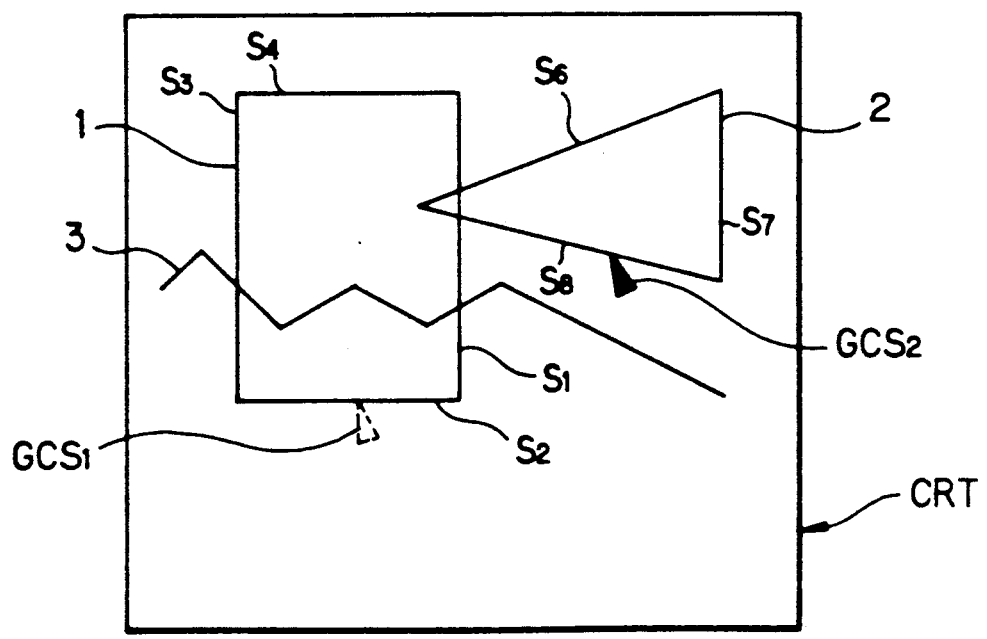

When the composite figure input mode is established, the processor 102 causes a message $M_1$, which is for designating figures (basic figures) used in defining a composite figure, to be displayed at the bottom of the CRT screen, as shown in FIG. 4. The operator responds to the message by selecting desired basic figures using the graphic cursor GCS (step 202). For example, the operator selects the basic FIGS. 1, 2, as shown in FIG. 5. When these two basic figures are designated, the processor 102 uses the part programs of the basic figures to determine whether there is a point of intersection between these figures (step 203). If there is no intersection between the figures, formation of a composite figure is construed to be impossible and an error message is displayed on the display unit 106 (step 204). The program then returns to step 202, another basic figure is designated at the foregoing processing is repeated from this point onward.

If the two basic figures do have a point of intersection, the processor 102 determines whether at least one of the basic figures is an open figure (step 205). An open figure refers to one which is not closed.

Figure 6A:
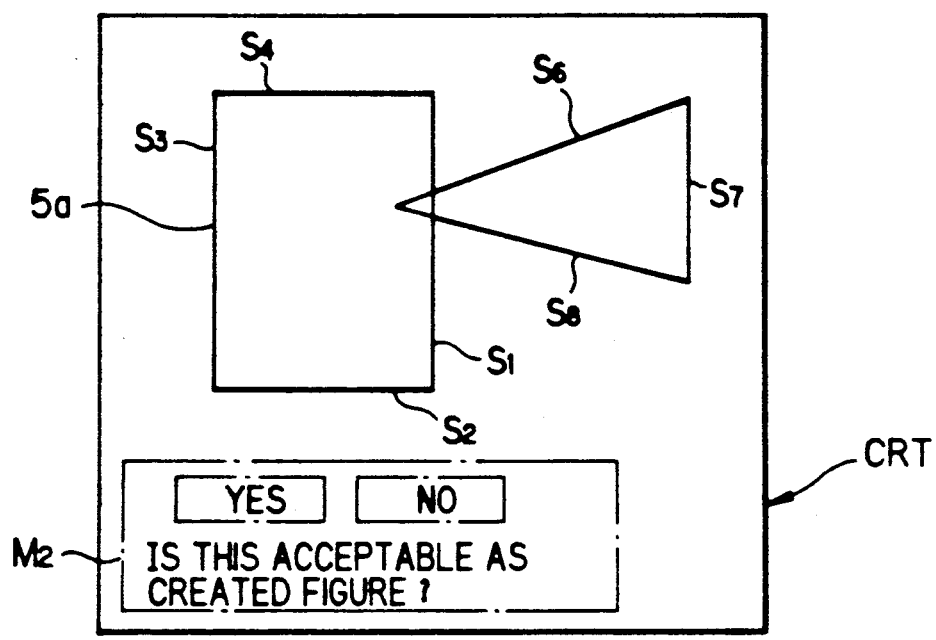

If neither of the basic figures is an open figure, a first closed figure [e.g., see the composite figure 5a in FIG. 6(a)] formed by combining the basic figures 1, 2 is displayed in a color (or in the form of a bold line) different from that of the basic figures (indicated by solid, fine lines), and message $M_2$ is displayed at the bottom of the CRT screen (step 206).

The operator responds to the message $M_2$ by determining whether the composite figure is the desired composite figure. If it is the desired composite figure, the "YES" item is selected; if not, the "NO" item is selected (step 207).

If the operator selects the "YES" item, the processor 102 creates the part program of the composite figure and terminates processing. For example, if the composite FIG. 5a of FIG. 6(a) is the desired composite figure, the processor 102 creates the following part program, registers it in the RAM 103 (step 208) and terminates processing:

$$S_1 = x_1 X$$
$$S_2 = y_1 Y$$
$$S_3 = x_2 X$$
$$S_4 = y_2 Y$$

-continued $$S_6 = P(x_3, y_3), P(x_4, y_4)$$

$$S_7 = P(x_4, y_4), P(x_5, y_5)$$

$$S_8 = P(x_5, y_5), P(x_3, y_3)$$

$$S_1, S_2, S_3, S_4, S_5, S_6, S_7, S_8$$

PEND

Figure 6B:
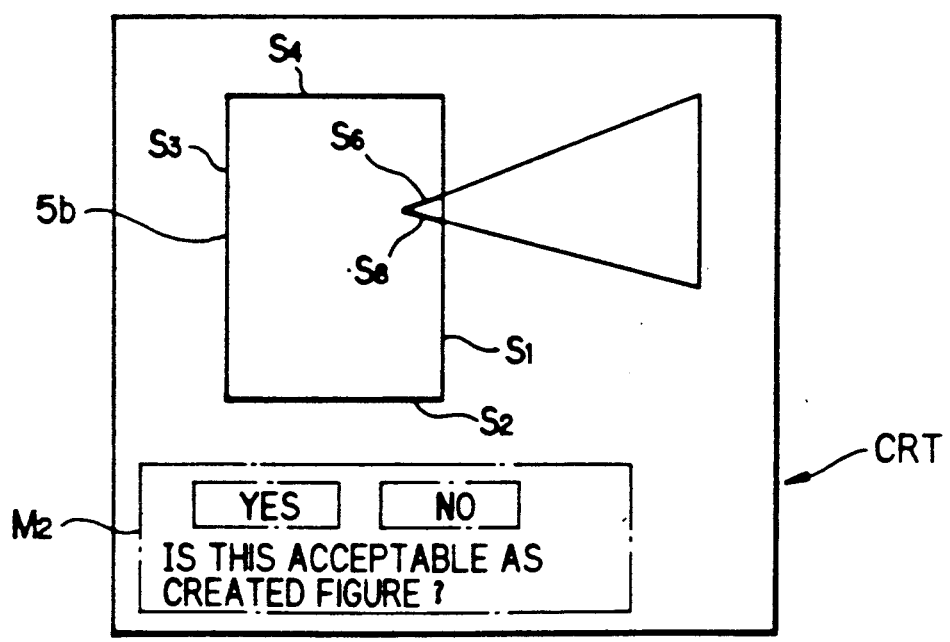
Figure 6:
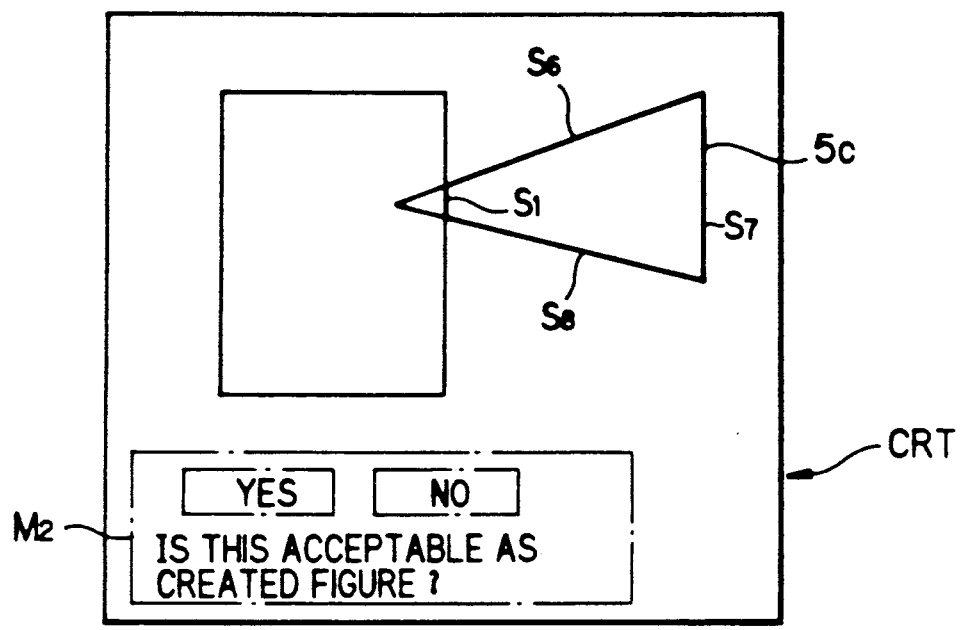
Figure 6:
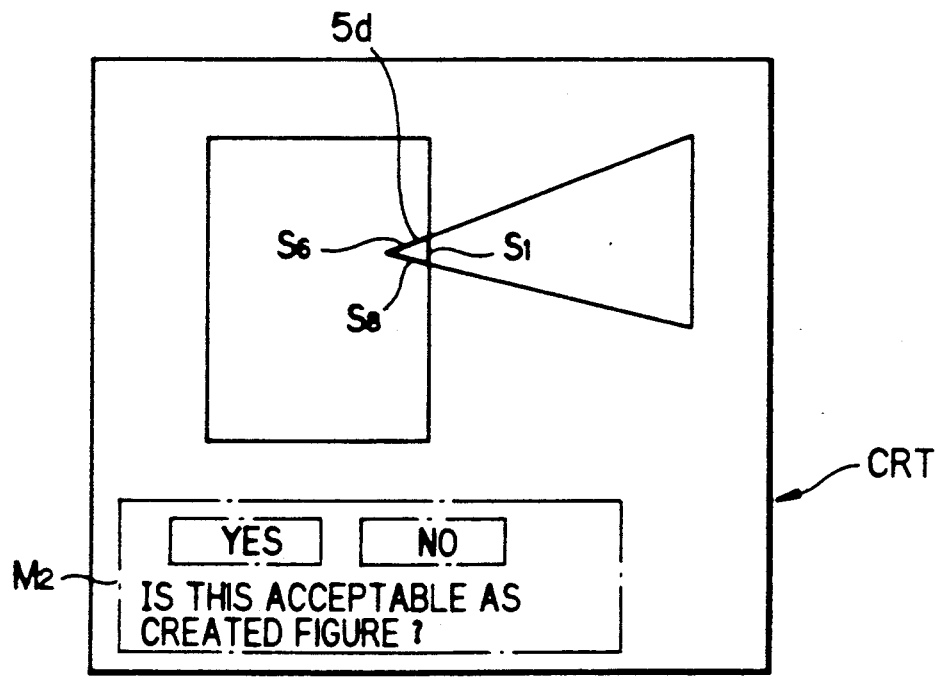

If the "NO" item is selected, the processor 102 determines whether there is another closed figure obtained by combining the two basic figures (step 209). If there is, the processing from step 206 onward is repeated. For example, the processor 102 successively paints or displays the composite FIG. 5b of FIG. 6(b), the composite FIG. 5c of FIG. 6(c), or the composite FIG. 5d of FIG. 6(d), causes the message M$_2$ to be displayed at the bottom of the CRT screen and repeats the processing from step 206 onward.

If the composite FIG. 5b is the desired figure, the profile definition statement thereof is $$S_1, S_2, S_3, S_4, S_1, S_6, S_8$$

If the composite FIG. 5c is the desired figure, the profile definition statement thereof is $$S_1, S_6, S_7, S_8$$

If the composite FIG. 5d is the desired figure, the profile definition statement thereof is $$S_1, S_6, S_8$$

If no other closed figure is found to be present in the decision step 209, the processor 102 terminates processing upon construing that the composite figure input mode has been cancelled.

Figure 7:
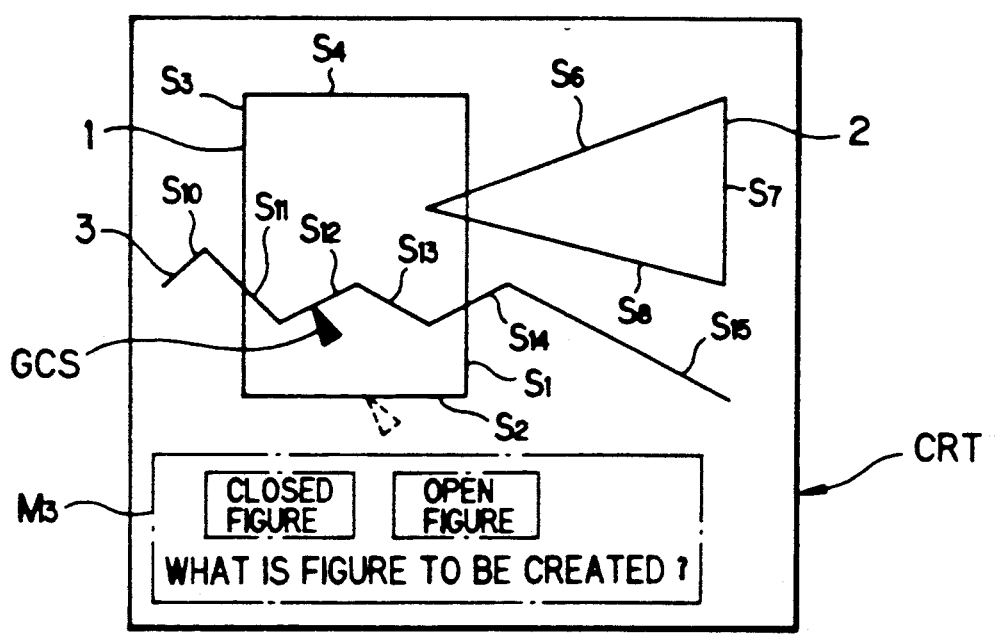
Figure 8A:
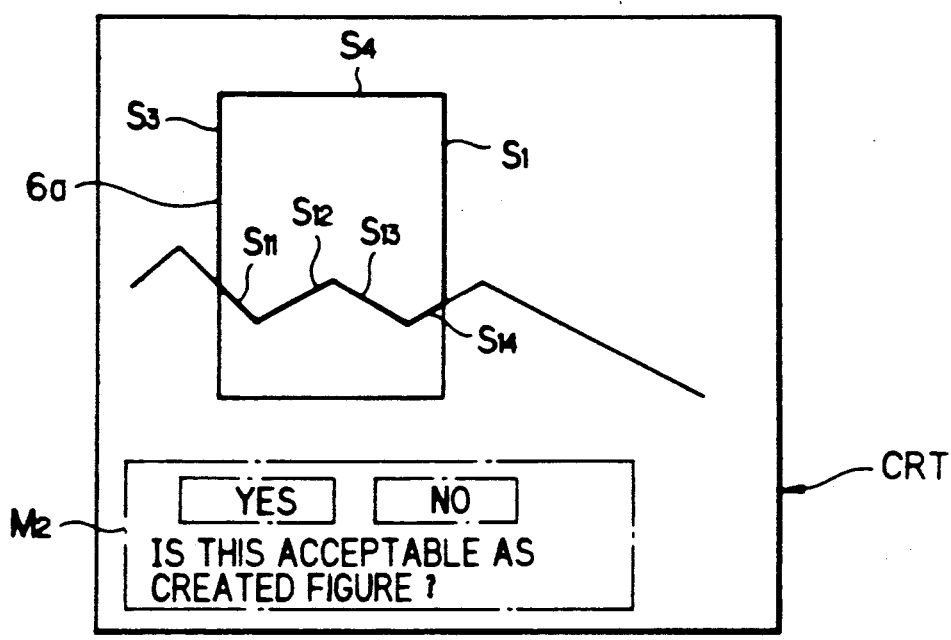
Figure 8B:
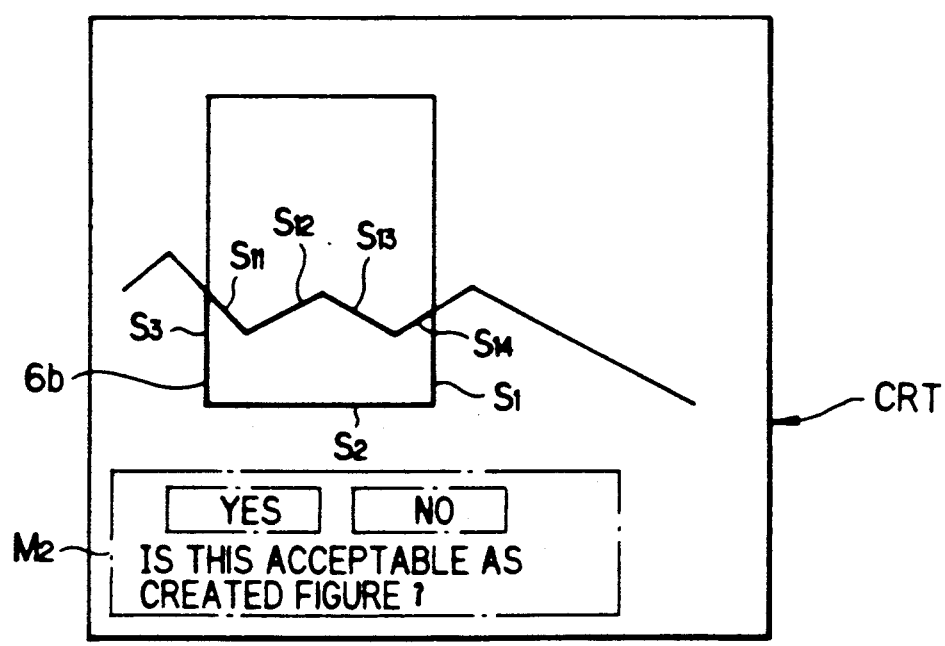

If the operator selects FIG. 1 and FIG. 3 in the composite figure input mode shown in FIG. 4, an open figure is found to be included when the decision is rendered at step 205 and, hence, the decision is "YES" and the processor 102 causes message M$_3$, shown in FIG. 7, to be displayed at the bottom of the CRT screen. Accordingly, the operator judges whether the desired composite figure is a closed figure or open figure and selects the "CLOSED FIGURE" item or "OPEN FIGURE" item on the CRT screen (step 210).

If the "CLOSED FIGURE" item is selected, the processor 102 executes processing from step 206 onward. Specifically, the processor successively paints or displays the closed figure [e.g., the composite FIG. 6a of FIG. 8(a) or the composite FIG. 6b of FIG. 8(b)] obtained by combining the basic FIGS. 1, 3, causes the message M$_2$ to be displayed at the bottom of the CRT screen and repeats the processing from step 206 onward.

Figure 9A:
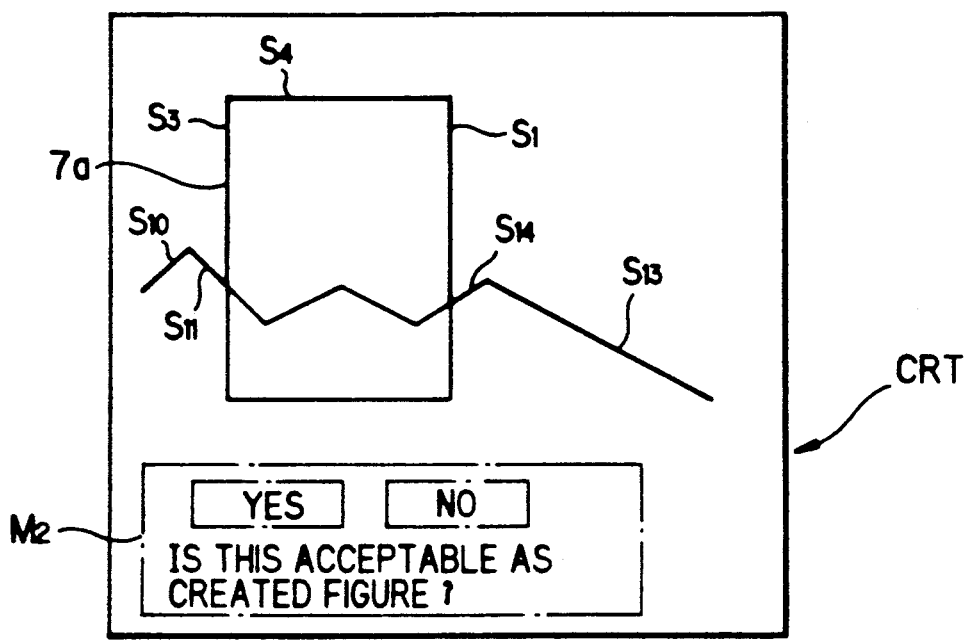
Figure 9B:
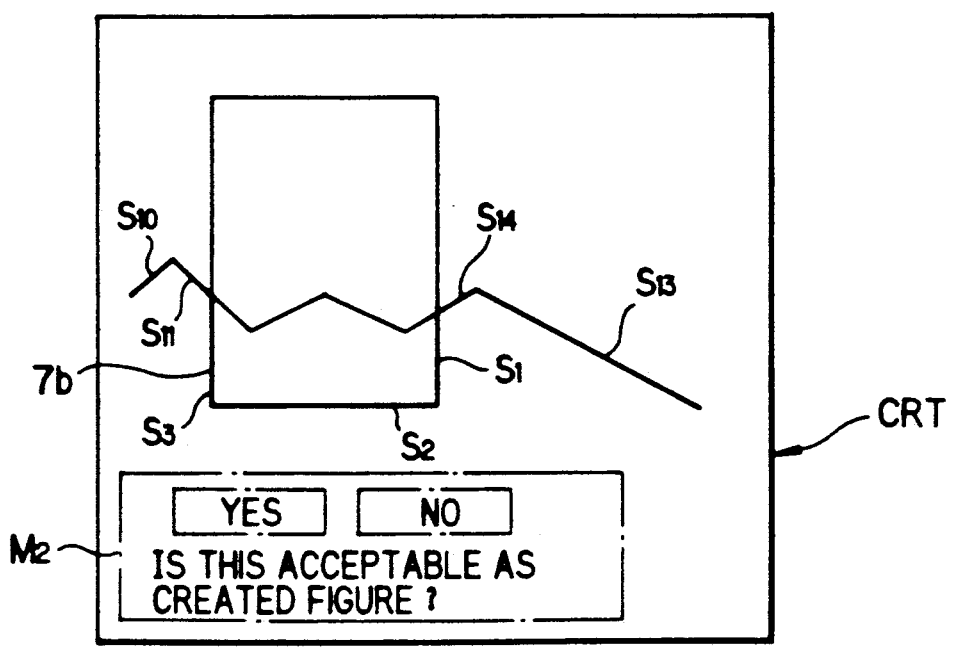
Figure 10:
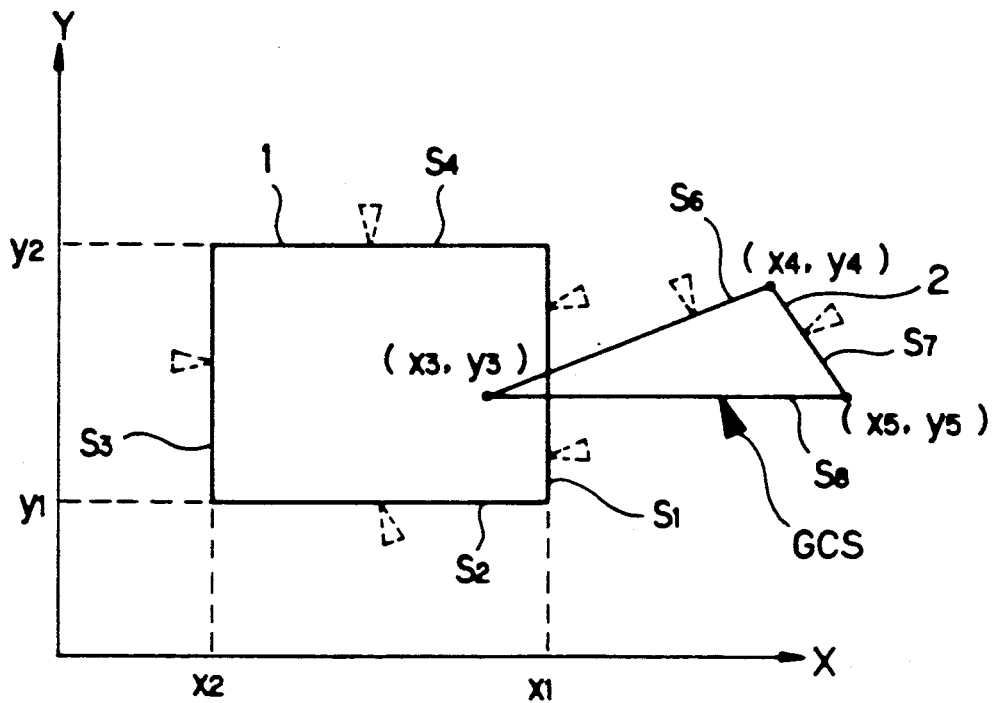
FIGS. 10 and 11 are views for describing the background of the invention.
Figure 11:
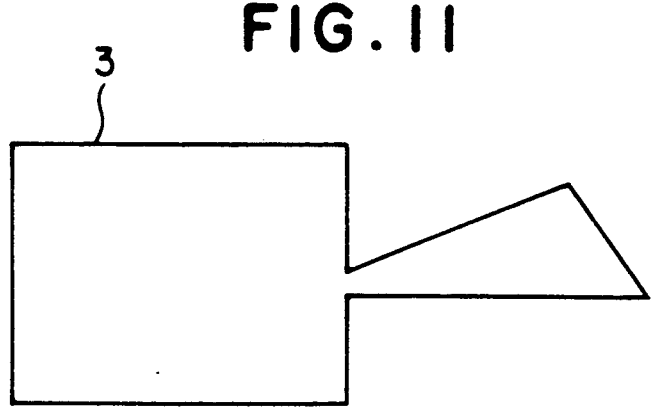

If the "OPEN FIGURE" item is selected in the decision of step 210, the processor 102 causes the open figure [e.g., the composite FIG. 7a in FIG. 9(a)] formed by combining the basic FIGS. 1, 3 to be displayed in a color (or in the form of a bold line) different from that of the basic figures (indicated by solid, fine lines) (step 211), and causes the message M$_2$ to be displayed at the bottom of the CRT screen. The operator determines whether the composite FIG. 7a is the desired composite figure, just as at step 207. If it is the desired composite figure, the "YES" item is selected; if not, the "NO" item is selected (step 212).

If the operator selects the "YES" item, the processor 102 creates the part program of the composite figure, registers it in the RAM 103 (step 208) and terminates processing. If the "NO" item is selected, the processor 102 determines whether there is another open figure with regard to the basic FIGS. 1, 3 (step 213). If there is, the processing from step 211 onward is repeated. For example, the processor paints or displays the composite FIG. 7b of FIG. 9(b), causes the message M$_2$ to be displayed at the bottom of the CRT screen and repeats the processing from step 211 onward.

If no other closed figure is found to be present in the decision step 213, the processor 102 terminates processing upon construing that the composite figure input mode has been cancelled.

Thus, in accordance with the present invention, when a composite figure is defined using already defined figures, combinable figures are automatically displayed on a display screen in successive fashion merely by designating basic figures, and the operator selects a desired figure to define the abovementioned figure. As a result, profile definitions (part programs) of basic figures can be utilized to make possible the creation of a part program by combining the figures quickly and easily.

We claim:

1. A composite-figure definition method for combining already defined first and second figures to define a new figure, characterized by:
   designating said first and second figures;
   determining whether said designated first and second figures have a point of intersection;
   displaying an error if there is no point of intersection;
   determining whether at least one of said designated first and second figures is an open figure if there is a point of intersection;
   successively painting closed figures, which are obtained by combining said designated first and second figures, if neither of said designated first and second figures is an open figure; and
   when a desired closed figure is painted, selecting said closed figure, thereby defining the composite figure.

2. The composite-figure definition method according to claim 1, characterized by:
   designating the new figure, which is obtained by combination, as being a closed figure or open figure if at least one of said designated first and second figures is an open figure;
   successively painting closed figures, which are obtained by combining said designated first and second figures, if a closed figure is designated; and
   when a desired closed figure is painted, selecting said closed figure, thereby defining the composite figure.

3. A composite-figure definition method according to claim 1, characterized by:
   designating the new figure, which is obtained by combination, as being a closed figure or open figure if at least one of said designated first and second figures is an open figure;
   successively painting open figures, which are obtained by combining said designated first and second figures, if an open figure is designated; and
   when a desired open figure is painted, selecting said open figure, thereby defining the composite figure.

4. A composite-figure definition method according to claim 1, characterized by displaying the composite figure so as to be distinguishable from other figures.

5. A composite-figure definition method according to claim 1, further comprising the steps of:
defining each figure by a part program which includes figure definition statements defining figure elements and a profile definition statement composed of a sequence of figure element names which defines a composite figure; and
determining whether there is said point of intersection, determining whether there is an open figure, generating a composite figure and performing display processing, by using part programs of the first and second figures.

6. A composite-figure definition method according to claim 5, wherein,
when a desired composite figure is selected, the part program is created comprising figure definition statements of said first and second figures and a profile definition statement composite of a sequence of figure element names which defines the composite figure.

7. A composite-figure definition method according to claim 2, characterized by displaying the composite figure so as to be distinguishable from other figures.

8. A composite-figure definition method according to claim 3, characterized by displaying the composite figure so as to be distinguishable from other figures.

9. A composite-figure definition method according to claim 2, further comprising the steps of:
defining each figure by a part program which includes figure definition statements defining figure elements and a profile definition statement composed of a sequence of figure element names which defines a composite figure; and
determining whether there is said point of intersection, determining whether there is an open figure, generating a composite figure and performing display processing, by using part programs of the first and second figures.

10. A composite-figure definition method according to claim 3, further comprising the steps of:
defining each figure by a part program which includes figure definition statements defining figure elements and a profile definition statement composed of a sequence of figure element names which defines a composite figure; and
determining whether there is said point of intersection, determining whether there is an open figure, generating a composite figure and performing display processing, by using part programs of the first and second figures.

11. A composite-figure definition method for combining already defined first and second figures to define a new figure, comprising the steps of:
designating said first and second figures;
determining whether said designated first and second figures have a point of intersection;
displaying an error if there is no point of intersection;
determining whether at least one of said designated first and second figures is an open figure if there is a point of intersection;
successively displaying closed figures, which are obtained by combining said designated first and second figures, if neither of said designated first and second figures is an open figure; and
when a desired closed figure is displayed, selecting said closed figure, thereby defining the composite figure.

* * * * *